United States Patent [19]
Costa

[11] Patent Number: 5,117,748
[45] Date of Patent: Jun. 2, 1992

[54] ROTARY GRILL SYSTEM

[76] Inventor: Robert N. Costa, 2112 Nicolet Cir., Richmond, Va. 23225

[21] Appl. No.: 463,326

[22] Filed: Jan. 10, 1990

[51] Int. Cl.$^5$ .............................................. A47J 37/04
[52] U.S. Cl. .................................. 99/441; 99/423; 99/427
[58] Field of Search ............... 99/427, 441, 421, 423, 99/499, 407; 220/95

[56] References Cited

U.S. PATENT DOCUMENTS

| | | | |
|---|---|---|---|
| 803,200 | 11/1904 | Stripe | 220/95 |
| 1,728,521 | 9/1929 | Anderson | 220/95 |
| 1,973,817 | 9/1934 | Tang | 99/441 |
| 2,253,434 | 8/1941 | Kernick | 99/427 |
| 2,604,842 | 7/1952 | Dolce | 99/423 |
| 2,631,525 | 3/1953 | Finizie | 99/423 |
| 2,697,395 | 12/1954 | Steriss | 99/423 |
| 2,708,871 | 5/1955 | Golinger | 99/423 |
| 2,966,841 | 1/1961 | Jigamian | 99/441 |
| 3,298,303 | 1/1967 | Waller | 99/423 |
| 3,331,308 | 7/1967 | Hoffert | 99/340 |
| 3,854,392 | 12/1974 | Eason | 99/441 |
| 4,370,920 | 2/1983 | Henriques et al. | 99/441 |
| 4,516,485 | 5/1985 | Miller | 99/339 |
| 4,633,772 | 1/1987 | Bowden et al. | 99/332 |

FOREIGN PATENT DOCUMENTS

| | | | |
|---|---|---|---|
| 203394 | 6/1939 | Switzerland | 99/441 |
| 2031717 | 4/1980 | United Kingdom | 99/441 |

Primary Examiner—Harvey C. Hornsby
Assistant Examiner—Patrick F. Brinson
Attorney, Agent, or Firm—John F. C. Glenn

[57] ABSTRACT

Apparatus having spaced rollers in a frame, and a handle on the frame for drawing the frame laterally across a grid covering a bed of hot coals. Lateral movement along the grid causes the rollers to rotate and thereby counter rotate hot dogs on the rollers while the heat from the coals passes between the rollers to grill the hot dogs.

7 Claims, 3 Drawing Sheets

ROTARY GRILL SYSTEM

BACKGROUND OF THE INVENTION

It is conventional to rotate hot dogs and like elongated meat food units as they are being grilled over a bed of hot coals or other radiant heat source, and to support the heat units spaced parallel rollers for that purpose. The rollers and the means to rotate them are conventionally built into the whole grilling apparatus. For example, see U.S. Pat. Nos. 2,604,842 (Dolce), 2,697,395 (Sterris), 2,708,871 (Golinger), and 3,331,308 (Hoffert).

It is also known to support hot dogs and the like on a hot plate while disposed between a series of fixed parallel bars held in a frame and to reciprocate the frame in a direction normal to the length of the bars in order to cause the hot dogs or the like to roll in alternate directions over the hot plate for example, see U.S. Pat. Nos. 3,298,303 (Waller), 4,516,485 (Miller), and 4,633,772 (Bowden et al).

The above-mentioned Hoffert U.S. Pat. No. 3,331,308 discloses removing single roller elements from a grill but not removing a set of rollers nor any food units with them. The Golinger U.S. Pat. No. 2,708,871 discloses pivoting a set of rollers within a grilling enclosure, but not while any food units are supported on the pivoting unit. The Bowden et al. U.S. Pat. No. 4,633,772 discloses a removable frame holding a set of space bars for use on the hot surface of a griddle, but obviously any food units on the griddle would remain there when the space bars are removed.

SUMMARY OF THE INVENTION

The present invention provides an assembly of rollers held in a frame which is readily transferrable to and from a cooking unit, together with any food items supported on the rollers during such transfer. When the assembly rests on a heated part of the grill or other cooking unit, and the frame is shifted laterally, the rollers are rotated by rolling over the heated support on which the assembly rests. This rolling movement causes any food items resting on the rollers to revolve with them, out of contact with the heated support. The resultant rotation of the food items exposes them to heat more evenly around their periphery, and thereby minimizes the chances of "popping" and thereby marring a hot dog or the like as a result of charring the thin intestinal skin which encases its meat content.

Other advantages objects and details of the invention will become apparent as the following disclosure proceeds.

BRIEF DESCRIPTION OF THE DRAWINGS

Present preferred embodiments of the invention are shown, for purposes of illustration only, in the accompanying drawings in which.

DETAILED DESCRIPTION OF PRESENT PREFERRED EMBODIMENTS OF THE INVENTION

Figure 4:
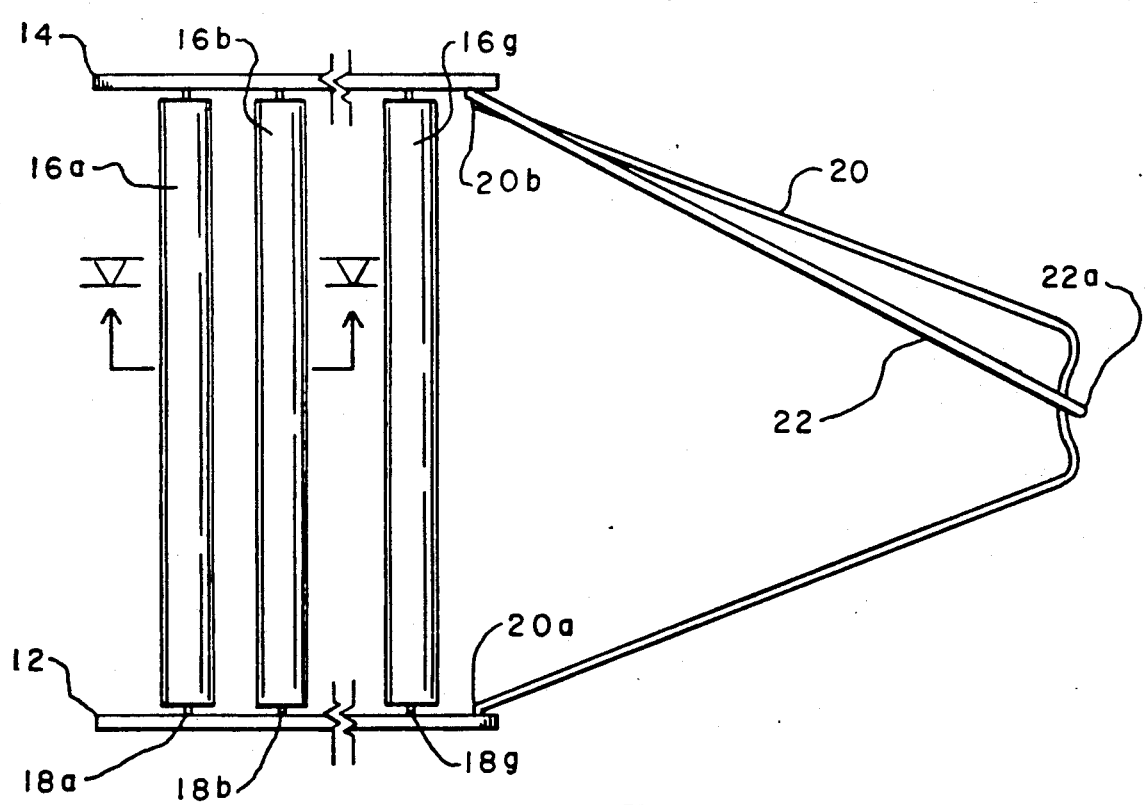
FIG. 4 shows a top view of what is shown in FIG. 2, but omitting the hot dogs and the grill and its grid.

Referring now more particularly to the drawings, there is shown a food grilling assembly 10 having the following principal elements; a frame 11 having a pair of spaced parallel frame members 12 and 14, a series of spaced and generally parallel cylindrical rollers 16a-g, extending between the frame members but not quite as long as the spacing between the frame members, a corresponding series of spaced parallel support roller rods 18a-g extending through the respective rollers and connected at their ends to the frame members, and a handle 20 for shifting the frame across a supporting grill, and for suspending the assembly from a hook during storage. An extension 22 of handle 20 facilitates grasping the handle to lift the assembly during transfer to and from a grill. The handle 20 is generally U-shaped, with its ends 20a and 20b pivotally connected to the ends of frame members 12 and 14 projecting beyond roller 16g. Extension 22 has one end 22a bent around the middle of handle 20 to pivotally connect extension 22 to the outer end of handle 20. The opposite end of extension 22 is in the form of a hook 22b which is readily engageable with roller 16a when the handle 20 and extension 22 are to be used for lifting the assembly. Hook 22b is disengaged from roller 16a preliminary to placing extension 22 next to handle 20 when handle 20 is to be used to push frame 11 and rollers 16a-g back and forth across a supporting grill (see FIG. 4) or during storage, when handle 20 is used to hang the assembly from a hook or else is laid across the rollers before putting the assembly in a drawer (preferably beneath the rollers as viewed in FIG. 1).

Figure 5:
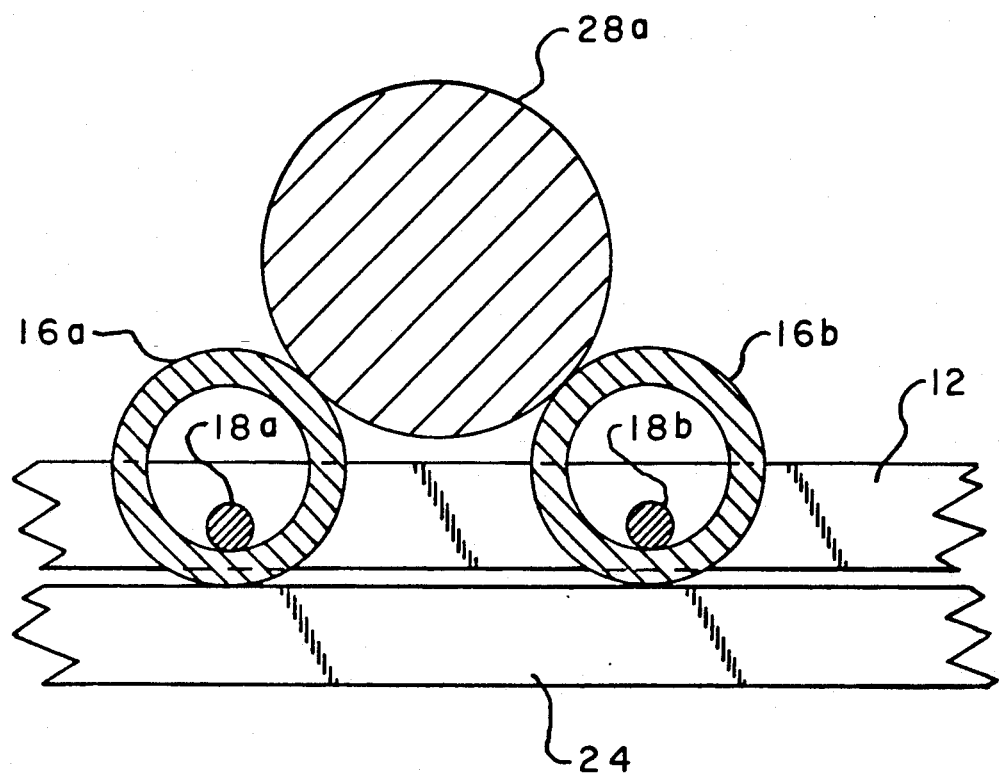
FIG. 5 shows an enlarged and broken away section on the line V—V in FIG. 4.

Although it would be feasible to journal the rollers 16a-g, to rotate about fixed axes relative to frame members 12 and 14, it is preferable for savings in weight and cost of manufacture to use rollers having a substantially larger inside diameter than the outside diameter of the cross rods 18a-g. Tests show that the resultant play between each roller and the cross rod extending through it does not prevent the roller from rolling against supporting grill surfaces when the rod is shifted laterally. It is preferable but not essential that the rollers and cross rods hold the frame members above the grill surface on which the rollers roll during grilling. As shown in FIG. 5, this means that the thickness of each roller is preferably greater than the intended clearance of the frame members 12 and 14 above the supporting surfaces on which the assembly rests (FIG. 5), such as a grid of spaced cross bars 24 over glowing coals 25 of a grill 26. Also, since the purpose of the rollers 16a-g is to support a series of generally cylindrical food products (such as hot dogs) 28a-f, each on end between a pair of the rollers 16a-g, the cross rods 18a-g must be close enough to each other to prevent the food products from falling between the rollers, even when lifting the frame members 12 and 14 above a grill with only one of the hot dogs on the rollers. In the latter case, the two rollers holding up that hot dog can spread apart further than is possible when a full group of hot dogs are resting on the rollers or when the rollers are resting on bars 24.

For example, in a successful prototype of the invention, the rollers were stainless steel tubes, about four and three-quarters inches long, one half inch outside diameter, and three-eighths inch inside diameter. The frame members were cut from quarter inch square aluminum bar stock, to a length of about seven and three-quarters inches. The cross rod ends were of about one eighth inch diameter cylindrical steel stock, and their ends were secured in the frame members with the lower most portion of the periphery of each end spaced about thirty seconds of an inch above the bottom surface of the adjacent bar stock frame member. When rolling over a supporting grid the frame members had a clearance of about one thirty second of an inch above the grid. The centers of the rods were spaced about one and one sixteenth inch apart.

Figure 1:
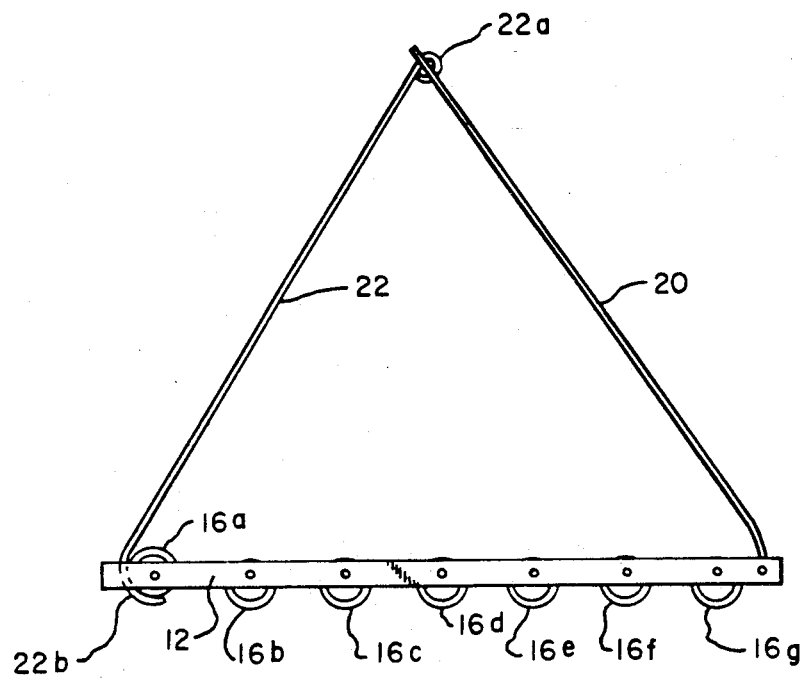
FIG. 1 shows a side view of a handle and its hooked extension supporting opposite ends of a frame holding a set of rollers on which a series of hot dogs are supported.
Figure 2:
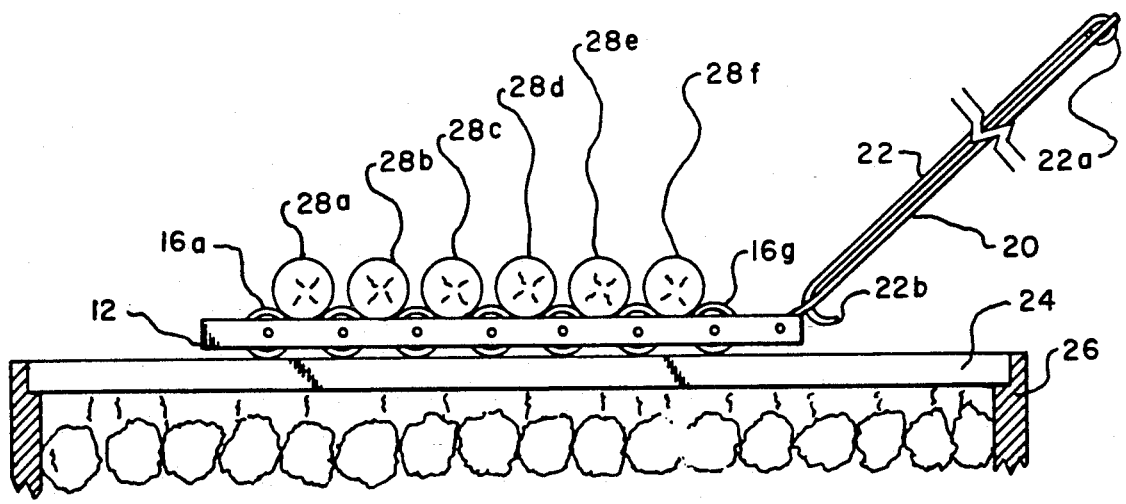
FIG. 2 shows a corresponding side view of the assembly of elements shown in FIG. 1, after being placed on a grid over the coals of a grill (shown in cross section)
Figure 3:
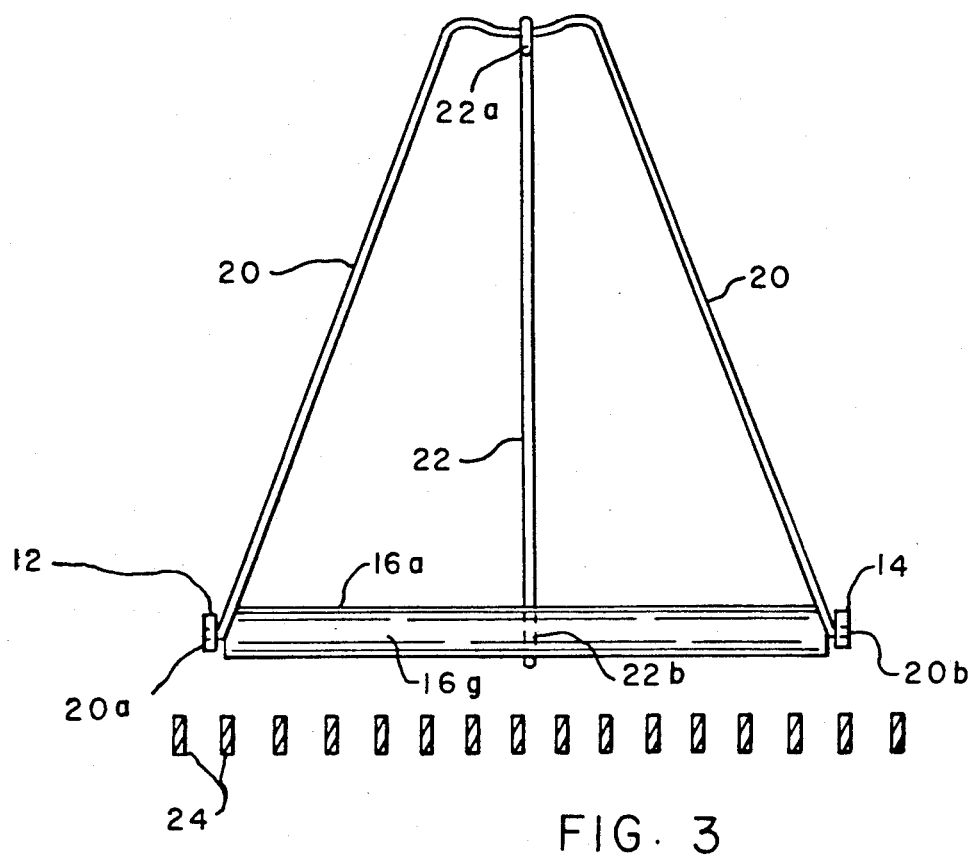
FIG. 3 shows an end view ofrom the right of FIG. 1, with part of the grill added in section below.

As shown in FIG. 1, the handle 20 and extension 22 can be lifted to transport the assembly to and from a grill. As shown in FIG. 2, when the assembly is placed on the cross bars 24 of a grill 26, the rollers 16a-g rest on the grill cross bars 24, and the cross rods 18a-g rest on the rollers 16a-g to support their weight and the weight of the frame members 12 and 14 and of the handle 20 and extension 22. The handle 20, for example, is then grasped by hand and used to push and pull the frame members 12 and 14 back and forth endwise, thereby causing the cross rods 18a-g to shift laterally and thereby cause the rollers 16a-g to roll back and forth along the supporting bars 24. The hot dogs 28a-f resting on the rollers are thereby caused to roll in opposite directions from the rollers, first one way and then the other as the frame members 12 and 14 are shifted endwise. Heat from the coals 25 radiates up between the bars 24 and rollers 16a-g to heat the hot dogs as they are being rotated, and the rotation distributes the heat received by the hot dogs around their respective peripheries. This provides a means for heating the hot dogs evenly around their peripheries and thereby minimizing the chances of their becoming over heated in one place. This is particularly a problem in the case of hot dogs, whose outer retaining skin is liable to rupture when over heated.

When grilling is completed, the roller assembly 10 with the hot dogs on the rollers is carried away by lifting the handle 20 and extension 22, and then the hot dogs are removed. This leaves an assembly of handle, frame members, cross rods and rollers, which is convenient to wash as a unit. The assembly, being generally flat, after the handle 20 and extensin 22 are folded against it, can readily be stored in a drawer. Alternatively, the assembly can be hung against a wall by suspending its handle 20 from a hook.

While present preferred embodiments and practices of the invention have been illustrated and described, it will be understood that the invention may be otherwise embodied and practiced within the scope of the following claims.

I claim:

1. Portable apparatus for supporting and rotating food units while they are grilled, on top of a grid over a grill, comprising a series of elongated and substantially cylindrical rollers, and being spaced from said grill a pair of elongated side members extending across opposite ends of the rollers, means connecting the rollers to the side members and permitting free rotation of the rollers in both directions when placed on top of said grill and rolled thereon, said connecting means positioning the rollers substantially parallel to each other and spaced apart, said connecting means also holding the rollers with their lower surfaces projecting beneath the side members when the side members extend horizontally and are supported by the rollers, the rollers having such diameters and spacing that they project upwardly sufficiently to support a plurality of rotatable food units each resting on and between a pair of the rollers, and being spaced from said grill and while so projecting upwardly also project downwardly sufficiently to roll against the top of said grid over a grill, and handle means connected to the apparatus for moving the apparatus and thereby causing the rollers to move laterally back and forth in engagement with and along the grid and consequently causing rotation of the rollers and resultant counter rotation of any food units resting on and between adjacent rollers.

2. Apparatus according to claim 1 in which the rollers are hollow cylinders and the means supporting the rollers for rotation allows substantial freedom of radial movement of the rollers relative to said members.

3. Apparatus according to claim 2 in which the means supporting the rollers for rotation comprises rods extending between said members and through the respective rollers, said rods having substantially less outside diameter than the inside diameter of said rollers.

4. Apparatus according to claim 2 in which said rods have their ends fixed in said members and in which the centers of said rods lie in a substantially common plane.

5. Apparatus according to claim 1, in which said side members have extensions in one direction extending beyond said rollers, and in which the handle means is pivotally secured to said extensions.

6. Apparatus according to claim 1 in which said handle means comprises an elongated handle pivotally connected to said members near one end of the apparatus, an elongated member pivotally connected to said handle, and means for attaching said elongated member to one of said rollers near the opposite end of the apparatus when the handle and elongated member are to be used to lift the apparatus, said roller attaching means being detachable from the roller when the apparatus is on a supporting grid.

7. Apparatus according to claim 6, in which said attaching means is a hook on the end of said elongated member.

* * * * *

UNITED STATES PATENT AND TRADEMARK OFFICE
CERTIFICATE OF CORRECTION

PATENT NO. : 5,117,748
DATED : June 2, 1992
INVENTOR(S) : COSTA, Robert N.

It is certified that error appears in the above-identified patent and that said Letters Patent is hereby corrected as shown below:

Column 4, lines 5 and 6, delete: "and being spaced from said grill".

Signed and Sealed this

Twelfth Day of April, 1994

Attest:

BRUCE LEHMAN

Attesting Officer

Commissioner of Patents and Trademarks